United States Patent [19]
Fischer

[11] Patent Number: 5,109,059
[45] Date of Patent: Apr. 28, 1992

[54] SPECKLED REFLECTIVE SPRAY-COATABLE COMPOSITIONS

[76] Inventor: Larry C. Fischer, 5919 N 45th St., Phoenix, Ariz. 85018

[21] Appl. No.: 504,471

[22] Filed: Apr. 4, 1990

Related U.S. Application Data

[63] Continuation-in-part of Ser. No. 363,700, Jun. 9, 1989, Pat. No. 4,981,904.

[51] Int. Cl.⁵ ............................................. C08L 67/00
[52] U.S. Cl. ...................... 524/600; 524/601; 524/602; 524/605; 524/607; 524/608; 525/242; 525/243; 525/244; 525/437; 525/445
[58] Field of Search ............... 524/600, 601, 602, 605, 524/607, 608; 525/437, 445, 242, 243, 244

[56] References Cited

U.S. PATENT DOCUMENTS

| | | | |
|---|---|---|---|
| 4,529,772 | 7/1985 | Druschke et al. | 524/555 |
| 4,571,363 | 2/1986 | Culbertson et al. | 428/332 |

Primary Examiner—John Kight, III
Assistant Examiner—Sam A. Acquah
Attorney, Agent, or Firm—Jerome J. Norris

[57] ABSTRACT

Stable spray-coatable, water base composition having about 2 percent solids, that dries into speckled films having a plurality of different colored surfaces resistant to flaking, comprising: a blend of a surfactant free first solution comprising, butyl methacrylate, butyl acrylate, 2-ethylhexyl acrylate, glacial methacrylic acid and styrene; a blend of a self-crosslinking second solution comprising, 2-ethylhexyl acrylate, butyl methacrylate, glacial methacrylic acid, styrene and at least one crosslinking polymer; a thickener gel; different colored dried latex paint chips, and ammonia.

8 Claims, No Drawings

SPECKLED REFLECTIVE SPRAY-COATABLE COMPOSITIONS

The present invention is a continuation-in-part of Ser. No. 07/363,700, filed Jun. 9, 1989, U.S. Pat. No. 4981904 for METALLIC REFLECTIVE SPRAY-COATABLE COMPOSITIONS, which prior application is herein incorporated by reference.

FIELD OF THE INVENTION

The present invention relates to a method of preparing easily usable stable, spray-coatable water base compositions that dry into a speckled film having a plurality of different colored surfaces that are substantially resistant to flaking.

BACKGROUND OF THE INVENTION

In the preparation of coating compositions in which coloring agents such as pigments are used to impart colors of varying shades and tones, it is not possible to obtain compositions having a plurality of either the same reflective surfaces or a plurality of different colored non-reflective surfaces. Also, when using pigments, a major problem encountered is how to get the pigmented particles or globules evenly dispersed so that the pigmented particles or globules suspended in the composition are not sheared during mixing or upon the application of the composition to a substrate. If the pigmented particles or globules are sheared at either of these stages, a break-up of the particles results and this causes intimate mixing or coalescence of the pigmented particles or globules, with the resultant undesirable effect of uneven film coloring or shading; and in any case, there is a lack of a film having a plurality of different colored non-reflecting surfaces.

On the other hand, when the mixing or blending, or size and physical configuration of the pigments in these compositions are such that they are not susceptible to shearing and break-up, the compositions are either not sprayable, or if they are sprayable, the dried film composition produced therefrom lacks a plurality of different colored non-reflective surfaces, runs off of the substrate before drying in the wet state, or is not resistant to flaking upon drying.

Accordingly, there is a need in the art for stable, water-base coating compositions that are spray-coatable, will not run-off of a vertical substrate in the wet state and is capable of drying into a plurality of different colored non-reflective surfaces that are substantially resistant to flaking upon drying.

A further need exist in the art to produce a stable, spray-coatable, water-base coating composition that dries into a plurality of different colored non-reflective surfaces, that are resistant to flaking under conditions of interior and exterior use.

The present invention provides a process for overcoming the above-mentioned shortcomings and disadvantages by producing a stable, spray-coatable water base composition that dries into a plurality of different colored non-reflective surfaces that are substantially resistant to flaking.

SUMMARY OF THE INVENTION

In general, the shortcomings and disadvantages encountered in attempting to obtain stable, spray-coatable water base compositions that dry into a plurality of different colored non-reflective surfaces that are resistant to flaking are accomplished by: (1) blending equal parts by volume of a surfactant free first solution comprising: butyl methacrylate, butyl acrylate, 2-ethylhexyl acrylate, glacial methacrylic acid and styrene, with about equal parts by volume of a surfactant containing a self-crosslinking second solution comprising: 2-ethylhexyl acrylate, butyl methacrylate, glacial methacrylic acid, styrene and at least one cross-linking polymer; (2) blending water into the mixture formed in step (1) until about a 22 percent solids mixture is obtained; (4) blending a thickener gel into the mixture formed in step (2) until a heavy cream is obtained; and (4) blending into the heavy cream formed in step (3), dried paint chips of different colors, and formed by pouring two different colored latex paints onto separate teflon belts, passing these belts through a dryer to form dried latex films, scraping off the dried films and grinding them in a hammermill to obtain chips having particle sizes or dimensions of about $0.35 \times 0.35 \times 0.00045$.

The thickener gel which is added in step (3) is prepared by adding water to carboxypolymethylene under high shear mixing for at least about 45 minutes until about a 4 percent by weight solids mixture is obtained. The mixture is then diluted with water to a 2 percent solids mixture, and ammonia is added in gradually until a thickener gel is formed.

The combination of these ingredients added in the sequence described provides the principal advantages of a ready premixed, water base, different colored non-reflective coating that is sprayable onto a variety of substrates.

DETAILED DESCRIPTION OF THE INVENTION

The water base coating composition is prepared by: (1) blending about equal parts by volume of a surfactant free first solution comprising: butyl methacrylate, butyl acrylate, 2-ethylhexyl acrylate, glacial methacrylic acid and styrene, with about equal parts by volume of a surfactant containing self-crosslinking second solution comprising: 2-ethylhexyl acrylate, butyl methacrylate, glacial methacrylic acid, styrene and at least one cross-linking polymer; (2) blending water into the mixture formed in step (1) until about a 22 percent solids mixture is obtained; (3) blending a thickener gel into the mixture formed in step (2) until a heavy cream is obtained; and (4) blending into the heavy cream formed in step (3), different colored dried latex paint chips of a copolymer of methyl methacrylate and butyl acrylate that have been poured onto teflon belts, dried to form latex films, and scraped off of said belts and ground in a hammermill to obtain chips having particle sizes of about $0.35 \times 0.35 \times 0.00045$. When this water base coating is cured upon drying, a speckled or multi-colored film results.

The manner of preparing the thickener gel in step (3) is important to obtaining a stable, spray coatable, water-base composition having speckled chips. It has been found that the thickener gel must be prepared by adding carboxypolymethylene to water at ambient temperatures under high shear mixing at up to about 1500 rpm for at least about 45 minutes until about a 4 percent by weight solids mixture is obtained; whereupon water is added until about a 2 percent solids mixture is obtained. Small amounts of a 28% aqueous ammonia solution is then added until a thickened gel is formed. A sufficient amount of the thickener gel is added slowly with blending to the mixture of step (2) until a heavy cream is formed. It is at this stage that dried paint chips of different colors are added with stirring until a mixture is obtained having a viscosity of between about 75 and about 150 poise.

Compositions having viscosities between these values are spray-coatable using a simple "hopper" or texture gun at pressures between about 30 to about 50 p.s.i.

The following examples will serve to illustrate the invention in greater detail.

EXAMPLE 1

Water base black and white dried latex paint chip coating composition without carboxypolymethylene thickener gel.

500 parts of a 30 percent solids surfactant free premixed solution containing about equal amounts by volume of butyl methacrylate, butyl acrylate, 2-ethylhexyl acrylate, glacial methacrylic acid and styrene is blended at ambient temperatures with 500 parts of a 44 percent solids self-crosslinking premixed solution containing about equal parts by volume of 2-ethylhexyl acrylate, butyl methacrylate, glacial methacrylic acid, styrene,a and N-methylol acrylamide cross-linking polymer and about 0.16 percent by weight of the surfactant Igepol CO-630[1]. Water is added to the blend until about a 22 percent solids mixture is obtained. A mixture of black and white dried latex paint chips[2] of particle sizes of 0.015"×0.008"×0.00045" are added with stirring until about 4% by weight of the mixture is attributable to the chips.

[1]Igepol CO-630 is nonyl phenoxy poly(ethyleneoxy)ethanol and is a trademark for a surfactant composition available from the GAF Corporation of New York, N.Y.

ble to flaking upon slight hand rubbing. It was therefore concluded that, at best, only a very weak bond had formed between the wood substrate and the water base mixture.

EXAMPLE 2

Water base black and white dried latex paint chip coating composition with specially prepared carboxypolymethylene thickener gel.

Same as Example 1, except that, after the 22 percent solids mixture is obtained, a thickener gel formed by adding water to carboxypolymethylene at ambient temperature under high shear mixing of about 1400 r.p.m. for about 50 minutes until a 4% by weight solids mixture is formed.

The mixture is diluted with water down to a 2% solids mixture, whereupon small aliquots of a 28% aqueous ammonia solution is added until a thickened gel is formed. The gel is added in small increments with blending until a heavy cream is formed. The black and white dried latex chips are added with stirring to obtain a mixture that contains about 4% by weight of the chips.

The chips did not settle out of the mixture, and the mixture was of a viscosity such that it did not flow off of a paint brush. Upon placing this mixture in a texture spray gun, and spraying at 35 p.s.i. onto a vertically disposed wood wall, the mixture showed no tendency to flow down or off of the wall. Upon drying, all of the chips were intact on the wall, and the film was characterized by a plurality of speckled black and white non-reflecting surfaces, and these surfaces were substantially

| Materials | Weight Ratio* | Parts Per Hundred (Volume Basis) |
|---|---|---|
| Natrosol 250 (2½% Hydroxyethyl cellulose) | 150.0 | 18.30 |
| Water | 101.2 | 12.14 |
| Tamol 850 (30%) | 5.4 | 0.54 |
| KTPP (Potassium tripolyphosphate) | 0.5 | 0.02 |
| Triton × 45 (Condensation of ethylene oxide and alkyl phenol) | 1.0 | 0.11 |
| Colloid 840 | 1.0 | 0.13 |
| Ethylene glycol | 25.0 | 2.69 |
| Ti-Pure R.902 (titanium dioxide) | 100.0 | 2.92 |
| AZO 11 (zinc oxide) | 26.0 | 0.54 |
| Snowflake (calcium carbonate) | 221.0 | 9.79 |
| Grind for 5 minutes, then add: | | |
| Attagel 50, magnesium aluminum silicate | 10.0 | 0.50 |
| Letdown: | | |
| Rhoplex AC.64 (60.5%) - Copolymer of methyl methacrylate and butyl acrylate) | 173.7 | 19.37 |
| Texanol (Trimethyl 1,3-pentanediol monoisobutyrate | 5.1 | 0.64 |
| Skane M-8 (Mildewcide) | 1.0 | 0.12 |
| Colloid 840 | 3.0 | 0.39 |
| Triton GR-5M (Sodium di-octylsulphosuccinate) | 1.0 | 0.10 |
| Water and/or Natrosol 250 | 264.2 | 31.70 |
| | 1088.1 | 100.00 |
| Formulation Constants | | |
| Pigment volume content (white) | 65% | |
| Volume solids | 26% | |
| pH | 9.5 | |
| Viscosity | 92 to 98 KU | |
| ICI | 0.65 | |

*Using weight ratio in pounds units will yield approximately 100 gallons of paint.

It was observed that the chips settled out of the mixture and the mixture was of such liquidity that it flowed off of a paint brush. When the mixture was placed in a texture spray gun and sprayed at about 35 p.s.i. onto a vertically disposed wood wall, the mixture rapidly flowed down the wall, and upon drying, the few flakes of black and white latex chips remaining provided a film of only a negligible speckled appearance. Also, the few chips remaining intact on the wall were easily susceptiresistant to flaking upon brisk hand rubbing. Therefore, it was concluded that a firm bond had formed between the coating and the wood substrate.

During the blending step (4) or before, if it appears that foaming is developing, a defoamer may be added in concentrations up to about 1.0 lb per 100 gallons of the mixture, and while any defoamer is capable of serving in this capacity in the context of the invention, it is preferred the *Colloid 840 be used, as it has been found to be compatible with the black and white dried latex chips, in that, it does not cause the chips to float to the film surface or cause "fisheyes" or "orange-peel" type problems.

| *COLLOID 840 PROPERTIES: | |
|---|---|
| Silicone - Polyglycol Appearance | Opaque off-white liquid |
| Activity | 100% |
| Specific Gravity @ 25° C.: | 1,014 |
| Density @ 25° C.: | 8.4 lbs./gallon |
| Viscosity (Brookfield) (#2 spindle @ 30 rpm) | 500 cps. |
| Flash point (PMCC): | 179° C. |
| Stability: | Excellent |

EXAMPLE 3

Same as Example 2, except that glycidyl acrylate is the crosslinking polymer.

EXAMPLE 4

Same as Example 2, except that glycidyl methacrylate is the crosslinking polymer.

When the mixtures of Examples 3 and 4 were placed in a texture spray gun and sprayed at 35 p.s.i. onto a vertical wood wall, these mixtures exhibited no tendencies to flow off of the wall, and the chips in the dried films of these coatings were substantially resistant to flaking upon brisk rubbing by hand.

It has been found that the amount of chips can vary between about 0.5% to about 7% by weight of the composition, and that, for sprayability, the composition should have a viscosity between about 75 to about 150 poise.

Moreover, the invention is operable with any different colored dried latex chips having dimensions which permit a plurality of speckled surfaces to remain intact upon drying and curing of the composition; however, preferred chips will be those having dimensions as small as about 0.004×0.004×0.00045 up to chips having dimensions of about 0.035×0.035×0.00045.

When the chip sizes are less than 0.004×0.004×0.00045, the speckled appearance does not result.

While the invention has been shown and described with respect to detailed embodiments thereof, it will be understood by those skilled in the art that various changes in form and detail thereof may be made without departing from the spirit and scope of the claimed invention.

What is claimed is:

1. A method of preparing a stable, spray-coatable, water-base composition that dries into a speckled film having a plurality of different colored surfaces that are substantially resistant to flaking, comprising:
    (1) blending about equal parts by volume of about a 30 percent solids, surfactant free first premixed solution comprising: butyl methacrylate, butyl acrylate, 2-ethylhexyl acrylate, glacial methacrylic acid and styrene with about equal parts by volume of about a 44 percent solids, self-crosslinking second premixed solution comprising: 2-ethylhexyl acrylate, butyl methacrylate, glacial methacrylic acid, styrene and at least one cross-linking polymer selected from the group consisting of N- o methylol acrylamide, glycidyl acrylate and glycidyl methacrylate;
    (2) blending water into a mixture formed in step (1) until about a 22 percent solids mixture is obtained;
    (3) blending a thickener gel into the mixture formed in step (2) until a heavy cream is obtained; and
    (4) blending into the heavy cream formed in step (3) different colored dried latex paint chips, to obtain a spray-coatable composition; said thickener gel being formed by adding water to carboxypolymethylene under high shear mixing for at least about 45 minutes until about a 4 percent solids mixture is obtained, diluting the mixture with water to obtain about a 2 percent solids mixture and adding ammonia to said 2 percent solids mixture to form a thickener gel.

2. The process of claim 1, wherein said cross-linking polymer is N-methylol acrylamide.

3. The process of claim 2, wherein the dried latex paint is a copolymer of methyl methacrylate and butyl acrylate.

4. The process of claim 3, wherein said dried latex chips have particle sizes of about 0.015"×0.008"×0.00045".

5. A stable spray-coatable, water base composition having a viscosity of between about 75 to about 150 poise and about 2 percent solids, said composition being capable of drying into a speckled film having a plurality of different colored surfaces that are substantially resistant to flaking, comprising: a blend of about equal parts by volume of a surfactant free first premixed solution comprising: butyl methacrylate, butyl acrylate, 2-ethylhexyl acrylate, glacial methacrylic acid and styrene; a blend of about equal parts by volume of a self-crosslinking second premixed solution comprising: 2-ethylhexyl acrylate, butyl methacrylate, glacial methacrylic acid, styrene and at least one cross-linking polymer selected from the groups consisting of N-methylol acrylamide, glycidyl acrylate and glycidyl methacrylate; carboxypolymethylene thickener gel; different colored dried latex paint chips, and ammonia.

6. The composition of claim 5, wherein said crosslinking polymer is N-methylol acrylamide.

7. The composition of claim 6, wherein the dried latex paint is a copolymer of methyl methacrylate and butyl acrylate.

8. The composition of claim 7, wherein said dried latex chips have particle sizes of about 0.015"×0.008"×0.00045".

* * * * *